United States Patent [19]

Agapiou et al.

[11] Patent Number: 5,442,019
[45] Date of Patent: Aug. 15, 1995

[54] PROCESS FOR TRANSITIONING BETWEEN INCOMPATIBLE POLYMERIZATION CATALYSTS

[75] Inventors: Agapios K. Agapiou, Humble; Michael E. Muhle, Kingwood; Gary T. Renola, Seabrook, all of Tex.

[73] Assignee: Exxon Chemical Company, Wilmington, Del.

[21] Appl. No.: 218,277

[22] Filed: Mar. 25, 1994

[51] Int. Cl.6 ............................................. C08F 2/38
[52] U.S. Cl. ..................................... 526/82; 526/84
[58] Field of Search .................................. 526/82, 84

[56] References Cited

U.S. PATENT DOCUMENTS 4,460,755  7/1984  Williams et al. ................. 526/84
4,883,847  11/1989  Leung et al. ..................... 526/82

*Primary Examiner*—Joseph L. Schofer
*Assistant Examiner*—Tom Weber
*Attorney, Agent, or Firm*—Jaimes Sher

[57] ABSTRACT

This invention relates to a process for transitioning between incompatible polymerization catalyst systems. Particularly, the invention relates to a process for transitioning from an olefin polymerization reaction utilizing a traditional Ziegler-Natta catalyst system to a metallocene-olefin polymerization reaction.

15 Claims, 4 Drawing Sheets

BASE CASE TRANSITION PROFILE

TRANSITION PROFILE FOR 230 PPM WATER INJECTION

TRANSITION PROFILE FOR DIRECT SEED BED START-UP

PROCESS FOR TRANSITIONING BETWEEN INCOMPATIBLE POLYMERIZATION CATALYSTS

FIELD OF THE INVENTION

This invention relates to a process for transitioning between incompatible polymerization catalyst systems. Particularly, the invention relates to a process for transitioning between an olefin polymerization reaction utilizing a traditional Ziegler-Natta catalyst system to an olefin polymerization reaction utilizing a bulky ligand transition metal metallocene catalyst system and vice-versa.

BACKGROUND OF THE INVENTION

During the production of olefin polymers in a commercial reactor it is often necessary to transition from one type of catalyst system producing polymers having certain properties and characteristics to another catalyst system capable of producing polymers of different chemical and/or physical attributes. Transitioning between similar traditional Ziegler-Natta type catalysts, or compatible catalysts, generally takes place easily. However, where the catalysts are incompatible or of different types the process is typically complicated. For example, transitioning between a traditional Ziegler-Natta type catalyst and chromium based catalyst, two incompatible catalysts, it has been found that some of the components of the traditional Ziegler catalyst or the cocatalyst/activator act as poisons to the chromium based catalyst. Consequently, these poisons prevent the chromium catalyst from promoting polymerization.

In the past, to accomplish an effective transition between incompatible catalysts, the first catalyzed olefin polymerization process is stopped by various techniques known in the art. The reactor is then emptied, recharged and a second catalyst is introduced into a reactor. Such catalyst conversions are time consuming and costly because of the need for a reactor shut-down for an extended period of time during transition.

The term "catalyst killing" or "catalyst killers" refers to the deactivation of the catalyst, which may be a partial or a complete suppression of a polymerization reaction. It is known to use low molecular weight polar gases or polar liquids in order to "kill" traditional Ziegler-Natta catalysts systems. For example, EP-A-116,917 describes using carbon dioxide and alcohol as Ziegler-Natta catalyst killers. U.S. Pat. No. 4,701,489 discloses the use of water to suppress a traditional Ziegler-Natta catalyst polymerization process. It is also known to use high molecular weight products such as polyglycols, epoxides, ethylene copolymers, organic titanium compounds, alkoxysilanes, peroxides, zeolites as a water carrier, or surface active agents to kill traditional Ziegler-Natta catalysts. U.S. Pat. No. 4,460,755 describes a process for converting a polymerization reaction catalyzed by a Ziegler-type catalyst into one catalyzed by a chromium-based catalyst. This particular transition process utilizes a hydroxyl-containing compound which interacts with the Ziegler-type catalyst by a physical or chemical means.

Recently, metallocene type catalyst systems are being employed in polymerization processes to produce polyolefins generally having superior physical and chemical attributes to those products of traditional Ziegler-Natta catalyzed processes.

There are a variety of known metallocene catalyst killers. For example, catalyst killers for metallocene/alumoxane based catalyst systems include methanol and n-butanol. PCT International Publication No. WO 92/14766, published Sep. 3, 1992 describes the use of a volatile and/or non-volatile killers of metallocene based catalysts in a high pressure polymerization process.

It would be highly advantageous to have a process for transitioning between incompatible catalysts, without the need for halting the polymerization reaction, emptying the reactor to rid it of the original catalyst system and restarting the polymerization reaction with another catalyst system.

SUMMARY OF THE INVENTION

The invention is drawn to a process for transitioning between at least two incompatible catalysts and/or catalyst systems in a polymerization process. In one embodiment, the process of the invention comprises the steps of: a) discontinuing the introduction of one of the incompatible catalysts or catalyst systems into a reactor; b) introducing an irreversible catalyst killer; and c) introducing into the reactor a second catalyst or catalyst system incompatible with the first catalyst system.

In a preferred embodiment the process of the invention further comprises the step of introducing a reversible catalyst killer.

In one embodiment of the invention a process for transitioning between a polymerization reaction catalyzed by a traditional Ziegler-Natta type catalyst system to a polymerization reaction catalyzed by a metallocene-type catalyst system is provided. In a preferred embodiment the process of the invention is continuous.

BRIEF DESCRIPTION OF THE DRAWINGS

The foregoing aspects, features and advantages of the invention will become clearer and more fully understood when the following detailed description is read in conjunction with the accompanying drawings, in which.

DETAILED DESCRIPTION OF THE INVENTION

Introduction

Figure 1:
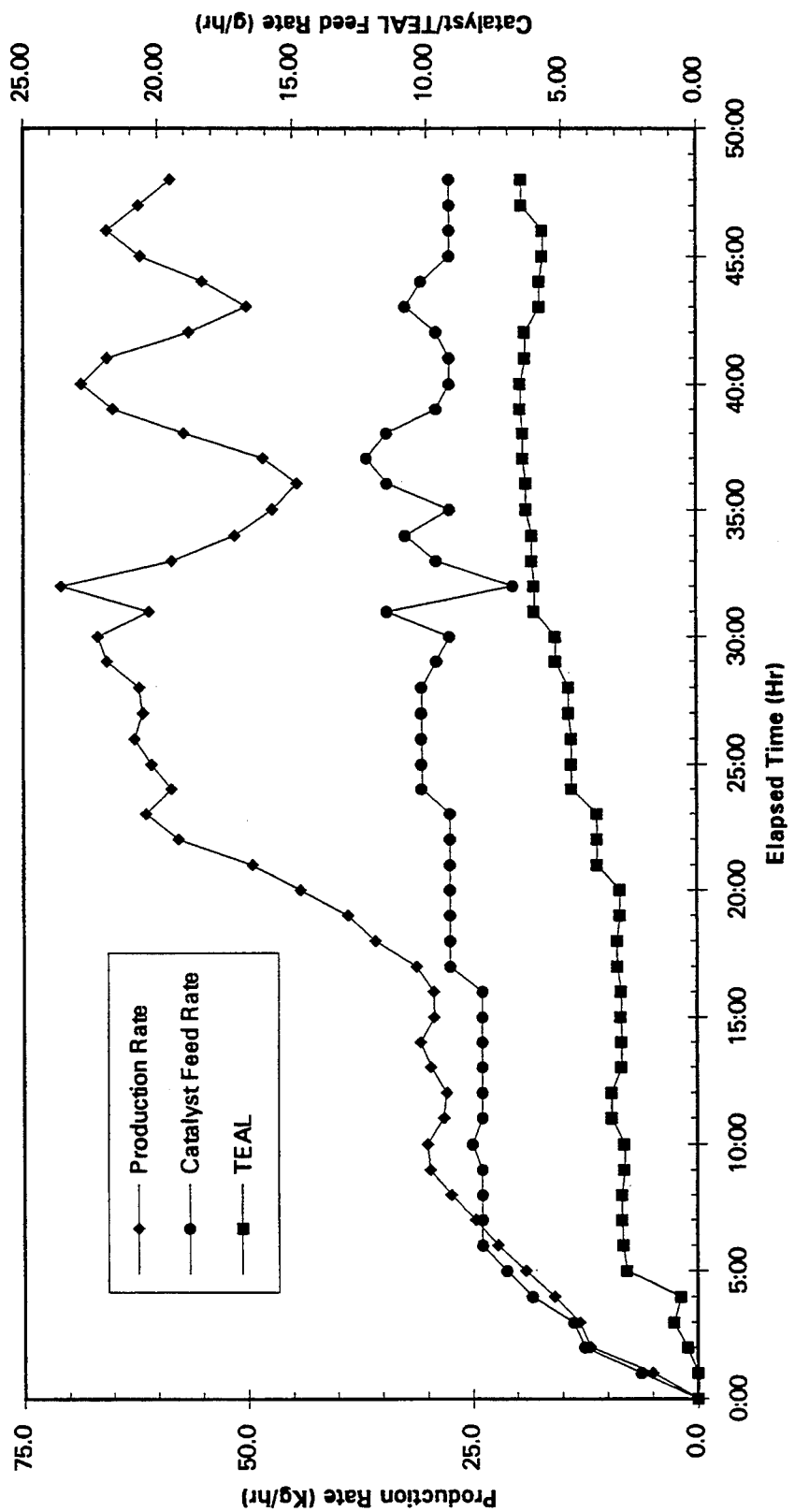
FIG. 1 illustrates a transition profile of production rate, catalyst feed rate and TEAL feed rate versus time for Example 1.

The invention relates to a process for transitioning between incompatible catalysts and/or catalyst systems to convert a reactor from producing one type of product to another with minimal reactor down-time.

In particular, the process is drawn to in a preferred embodiment transitioning between traditional Ziegler-Natta catalyst/catalyst system and a metallocene catalyst/catalyst system. For the purposes of this patent specification and appended claims the terms "catalysts" and "catalyst systems" are used interchangeably.

The process of this invention can be used in a gas phase, solution phase, slurry or bulk phase polymerization process. A gas phase polymerization process in a fluidized bed reactor is preferred.

In a typical continuous gas fluidized bed polymerization process for the production of polymer from monomer, a gaseous stream comprising monomer is passed through a fluidized bed reactor in the presence of a catalyst under reactive conditions. A polymer product is withdrawn. Also withdrawn is a cycle gas stream, which is continuously circulated and usually cooled, and together with additional monomer sufficient to replace the monomer polymerized is returned to the reactor. In one embodiment the cycle gas stream is cooled to form a gas and a liquid phase mixture that is then introduced into the reactor. For a detailed description of a gas phase process see U.S. Pat. Nos. 4,543,399 and 4,588,790 herein fully incorporated by reference.

When transitioning between compatible catalysts there are typically only slight differences in their performance towards hydrogen and comonomer, however, when transitioning to an incompatible catalyst it is not as straightforward. For example, the extreme different responses to molecular weight regulators, such as hydrogen and comonomer, of traditional Ziegler-Natta catalysts and metallocene catalysts makes these catalysts incompatible. Any traces of active Ziegler-Natta catalyst will produce very high molecular weight product under metallocene catalyst reactor conditions. Furthermore, particularly in a continuous transitioning process, the interaction between the two incompatible catalysts may lead to production of high levels of small particles less than about 100 microns, termed fines. These fines can induce operability problems in the reactor such as fouling and sheeting. Applicants have discovered a process for transitioning between two or more incompatible catalysts, particularly useful in a continuous gas phase polymerization process, thus, mitigating or eliminating the problems mentioned above.

During the transition of a first catalyst to a second catalyst, particularly in a continuous process, it is reasonable to expect that interaction or contact of the two catalysts will occur. For compatible catalysts, the transition normally occurs by interrupting the feed of the first catalyst while introducing the feed of the second. Typically it takes many hours until the first catalyst is entirely consumed. So, for a long period of time the resin produced is a mixture from both the first and the second catalyst.

Catalyst Compatibility

As previously discussed, compatible catalysts are those catalysts having similar kinetics of termination and insertion of monomer and comohomer(s) and/or do not detrimentally interact with each other.

For the purposes of this patent specification and appended claims "incompatible catalysts" are those that satisfy one or more of the following: 1 ) those catalysts that in each others presence reduce the activity of at least one of the catalysts by greater than 50%; 2) those catalysts such that under the same reactive conditions one of the catalysts produces polymers having a molecular weight greater than two times higher than any other catalyst in the system; and 3) those catalysts that differ in comonomer incorporation or reactivity ratio under the same conditions by more than about 30%.

While in the preferred embodiment the process of the invention specifically addresses transitioning between a traditional Ziegler-Natta catalyst and a metallocene catalyst, it is within the scope of this invention that the process of the invention would apply to any transition between incompatible catalysts. For example, transitioning between a traditional Ziegler-Natta catalyst and a chromium catalyst or transitioning between a chromium catalyst and a metallocene catalyst or even transitioning between a traditional Ziegler-Natta titanium catalyst to a Ziegler-Natta vanadium catalyst This invention contemplates that the direction of transitioning between incompatible catalysts is not limiting, however, it is preferred that the process of the invention transition from any other catalyst incompatible with a metallocene catalyst.

Traditional Ziegler-Natta catalysts typically in the art comprise a transition metal halide, such as titanium or vanadium halide, and an organometallic compound of a metal of Group 1, 2 or 3, typically trialkylaluminum compounds, which serve as an activator for the transition metal halide. Some Ziegler-Natta catalyst systems incorporate an internal electron donor which is complexed to the alkyl aluminum or the transition metal. The transition metal halide may be supported on a magnesium halide or complexed thereto. This active Ziegler-Natta catalyst may also be impregnated onto an inorganic support such as silica or alumina. For the purposes of this patent specification chromocene catalysts, for example, described in U.S. Pat. No. 4,460,755, which is incorporated herein by reference, are also considered to be traditional Ziegler-Natta catalysts. For more details on traditional Ziegler-Natta catalysts, see for example, U.S. Pat. Nos. 3,687,920, 4,086,408, 4,376,191, 5,019,633, 4,482,687.4,101,445, 4,560,671, 4,719,193, 4,755,495, 5,070,055 all of which are herein incorporated by reference.

Metallocene catalysts, for example, are typically those bulky ligand transition metal compounds derivable from the formula:

where L is a bulky ligand; A is at least one halogen leaving group, M is a transition metal and m and n are such that the total ligand valency corresponds to the transition metal valency. Preferably the catalyst is four co-ordinate such that the compound is ionizable to a 1 + valency state.

The ligands L and A may be bridged to each other, and if two ligands L and/or A are present, they may be bridged. The metallocene compound, may be full-sandwich compounds having two or more ligands L which may be cyclopentadienyl ligands or cyclopentadiene derived ligands or half-sandwich compounds having one ligand L, which is a cyclopentadienyl ligand or derived ligand.

The metallocene compounds contain a multiplicity of bonded atoms, preferably carbon atoms, forming a group which can be cyclic. The bulky ligand can be a cyclopentadienyl ligand or cyclopentadienyl derived ligand which can be mono- or poly-nuclear or any other ligand capable of $\eta$-5 bonding to the transition metal. One or more bulky ligands may be $\pi$-bonded to the transition metal atom. The transition metal atom may be a Group 4, 5 or 6 transition metal and/or a transition metal from the lanthanide and actinide series. Other ligands may be bonded to the transition metal, such as at least one halogen as a leaving group that is detachable from the transition metal. Non-limiting examples of metallocene catalysts and catalyst systems are discussed in for example, U.S. Pat. Nos. 4,871,705, 4,937,299, 5,017,714, 5,120,867, 5,057,475, 5,096,867, 5,055,438, 5,227,440, 5,153,157, 5,198,401, 5,241,025, 4,530,914, 4,952,716, 5,064,802, 5,124,418, 4,808,561, 4, 897,455 all of which are herein fully incorporated by reference. Also, the disclosures of EP-A-0129,368, EP-A-0520732, EP-A-0277003, EP-A-0277004, EP-A-0420436, WO 91/04257 WO 92/00333, WO 93/08221, and WO 93/08199 are all fully incorporated herein by reference.

In the preferred embodiment the metallocene catalyst of this invention is supported on support materials known in the art, for example, inorganic oxides, like silica, alumina or magnesia or polymeric, such as polyethylene.

It is also contemplated by this invention that the metallocene catalyst of the invention can be supported on a single support or separately supporting the metallocene on one support and the activator, should one be used, on another.

Polymerization and Catalyst Inhibitors

In order to inhibit polymerization of a first incompatible catalyst, it is necessary to interrupt catalyst injection into the reactor. Stopping the first catalyst feed into the reactor does not immediately stop polymerization reactions occurring within the reactor because the fluidized bed contains catalyst particles which can still polymerize for an extended period of time. Even if one were to allow the polymerization reactions within the reactor to continue for a period of time, the catalyst within the reactor would not be completely deactivated for a considerable period.

Thus, to substantially terminate these polymerization reactions within the reactor, polymerization inhibitors or "catalyst killers" are employed. For the purposes of this patent specification, the catalyst killers do not include that minor portion of catalyst killers that may be contained in the monomer or comonomer feed streams during normal polymerization conditions (for example, internal olefins).

There are two general types of polymerization inhibitors. First, reversible catalyst killers useful in the invention are those such as, but not limited to, for example, carbon monoxide (CO), carbon dioxide ($CO_2$), internal olefins, 2-butene and the like, internal dienes, 2-4 hexadiene and the like, alkenes and butadienes. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue. These reversible catalyst killers can be used in any combination or order of introduction in the process of this invention.

Second, there are irreversible catalyst killers, those killers that irreversibly inactivate a catalyst's ability to polymerize olefins. Irreversible catalyst killers of the invention include but are not limited to, for example, oxygen, water ($H_2O$), alcohols, glycols, phenols, ethers, carbonyl compounds such as ketones, aldehydes, carboxylic acids, esters, fatty acids, alkynes such as acetylene, amines, nitriles, nitrous compounds, pyridine, pyroles, carbonylsulfide (COS) and mercaptans. These irreversible catalyst killers can be used in any combination or order of introduction in the process of this invention.

It is not beyond the scope of this invention that a mixture of one or more of these reversible and irreversible catalyst killers can be combined before introduction into a reactor, however, one of ordinary skill in the art will recognize that some of these killers could react with each other and are thus better introduced separately.

In the preferred embodiment in the process of the invention, once the first incompatible catalyst feed has been interrupted, a reversible catalyst killer is introduced into the reactor for a period of time sufficient to substantially deactivate the catalyst in the reactor and thus, substantially preventing further polymerization from occurring. The use of the reversible catalyst killer decreases the likelihood of sheeting and/or fouling occurring in the reactor where the process of the invention takes place within the reactor in which polymerization was occurring with the first catalyst. In an alternate embodiment prior to introducing the irreversible catalyst killer, the first catalyst is rendered substantially inactive, or in other words, substantially incapable of polymerization. The preferred reversible catalyst killers of the invention are CO and/or $CO_2$. The amount of reversible catalyst killer used depends on the size of the reactor and the quantity and type of catalysts and cocatalysts in the reactor. Preferably, the reversible catalyst killer of the invention is used in an amount based on the total gram atoms of the catalyst transition metal components. However, where any activator or cocatalyst is used with the first catalyst, and such activator or cocatalyst is capable of reacting with the second catalyst, the reversible catalyst killer is used in an amount based on the total gram atoms of catalyst transition metal components and any activator. In one embodiment the reversible killer is used in amount greater than 1 molar equivalent, preferably greater than 2 molar equivalents based on the total gram atoms transition metal of the catalyst in the reactor.

In another embodiment once the reversible catalyst killer has been introduced into the reactor, a period of time of about 5 minutes to 24 hours, preferably 1 to 12 hours, more preferably 1 to 6 hours and most preferably 1 to 2 hours passes before introducing an irreversible catalyst killer. The duration depends on the nature and amount of catalyst and volume of the reactor. In a gas phase reactor there is a seed bed that is typically very large in size and quantity of polymer. Thus, a sufficient period of time is needed to allow the reversible catalyst killer to disperse throughout the reactor, particularly throughout any polymer product within the reactor.

Once the reversible catalyst killer has been introduced into the reactor, in the preferred embodiment, an irreversible catalyst killer is introduced into the reactor. The preferred irreversible catalyst killer is water.

The amount of irreversible catalyst killer used is important. It is necessary before introducing a second incompatible catalyst that the first catalyst is substantially deactivated and cannot reactivate itself. The amount used is also important because an excess amount of irreversible killer remaining in the reactor could partially or totally deactivate the second incompatible catalyst upon its injection into the reactor.

Thus, in the preferred embodiment the amount of irreversible catalyst killer introduced into the reactor is in the range of 0.1 to 1000 molar ratio of irreversible catalyst killer to the total metal of the catalyst and any activator in the reactor, preferably 0.1 to 100, more preferably about 1 to about 10, even more preferably about 1 to about 5 and most preferably greater than about 1 to less than about 2. However, where any activator or cocatalyst is used with the first catalyst, and such activator or cocatalyst is capable of reacting with the second catalyst, the irreversible catalyst killer is used in an amount based on the total gram atoms of catalyst transition metal components and any activator. In another embodiment, the irreversible catalyst killer is used in an amount in the range of 100% to 125% of that necessary to fully inactivate all of the active first catalyst.

In yet another embodiment once the irreversible catalyst killer has been introduced into the reactor a period of time of about 5 minutes to about 24 hours, preferably about 1 hour to about 12 hours, more preferably about 1 hour to 6 hours and most preferably about 1 hour to 2 hours passes before continuing the transitioning process. Again, the duration of exposure is for the same reasons stated for the reversible catalyst killer.

Typically, in the process of the invention it is important to substantially free the reactor of impurities, particularly the irreversible catalyst killer, which can render the second catalyst inactive upon its introduction into a reactor. Thus, in the preferred embodiment of the invention an organometallic compound is introduced into the reactor. The organometallic compound reacts with some of the irreversible catalyst killer converting the killer to compounds that can be easily purged or removed from the reactor. Such organometallic compounds can include for example, $BX_3$ where X is a halogen, $R_1R_2Mg$, ethyl magnesium, $R_4CORMg$, RCNR, $ZnR_2$, $CdR_2$, LiR, $SnR_4$ where R are hydrocarbon groups that could be the same or different.

The organometallic compounds useful are those compounds of Group 1, 2, 3 and 4 organometallic alkyls, alkoxides, and halides. The preferred organometallic compounds are lithium alkyls, magnesium or zinc alkyls, magnesium alkyl halides, aluminum alkyls, silicon alkyl, silicon alkoxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMAL), tri-isobutylaluminum (TIBAL) and tri-n-hexylaluminum (TNHAL) and the like.

In one preferred embodiment the organometallic is a hydrocarbon aluminum of the formula $AlR_{(3-a)}X_a$ where R is alkyl, cycloalkyl, aryl or a hydride radical. Each alkyl radical can be straight or branched chain having from 1 to 20 carbon atoms, preferably 1 to 10 carbon atoms. X is a halogen for example chlorine, bromine or iodine, chlorine is preferred; a is 0, 1 or 2.

If TMAL is used and water is used as the irreversible catalyst killer methylalumoxane is formed, which is a preferred activator for some metallocene catalysts. However, more preferably TEAL is used.

Start-up Procedures

During the polymerization with the first incompatible catalyst, gases accumulate within the reactor, which originate from the electron donor when the first catalyst is especially a Ziegler-Natta catalyst. These gases are typically poisonous to the first catalyst, particularly to the second incompatible catalyst. These gases for a traditional Ziegler-Natta catalyst include, for example, tetrahydrofuran (THF), ethanol, ethyl benzoate and the like. Also, the introduction of the reversible and irreversible catalyst killers also produce by-products that can be detrimental to any polymerization process.

Thus, before introducing the second incompatible catalyst the reactor contents are subjected to what is known in the art as pressure purging. Typically the procedure is used in handling any air/moisture sensitive materials to remove, purge, or reduce in the process of the invention, for example, the catalyst killers and by-products thereof and reactants to a lower level.

Once this procedure is complete the gas composition in the reactor system as a direct consequence of the first catalyst is adjusted for the second catalyst. For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2–15 carbon atoms, for example, alpha-olefin of ethylene, propylene, butene-1, pentene-1, 4-methylpentene-1,hexene-1, octene-1, decene-1 and cyclic olefins such as styrene. Other monomers can include polar vinyl, dienes, norborene, acetylene and aldehyde monomers. In the preferred embodiment, the gas composition contains ethylene and at least one alpha-olefin having 3 to 15 carbon atoms.

Typically, the gas composition also contains an amount of hydrogen to control the melt index of the polymer to be produced. In typical circumstances the gas also contains an amount of dew point increasing component with the balance of the gas composition made up of a non-condensable inerts, for example, nitrogen.

Depending on the second catalyst to be introduced into the reactor the gas composition, such as the comonomer and hydrogen gas concentrations, can be increased or decreased. In the preferred embodiment the gas composition is decreased, particularly when a metallocene catalyst is utilized as the second catalyst in the process of the invention.

Typically, the reactant gas composition is diluted as above, for example, by either pressure purging or flow purging procedures well known in the art. During this step, as discussed above, impurities such as electron donors from the catalyst are also removed. Once the reactant concentrations are sufficiently diluted to accommodate the second catalyst and substantially all poisons are removed, the next step in the invention is to introduce the second catalyst.

In the preferred embodiment, the fluidized bed is maintained in a fluidized condition during the process of this invention.

In another embodiment of the invention, before the introduction of the second catalyst, the same or different organometallic compound as previously discussed, is introduced into the reactor. For purposes of this specification, this step in the process of the invention is referred to as the "titrating step". Details of this procedure, referred to as surface passivation, are described in U.S. Pat. No. 5,106,926 incorporated herein by reference. In the preferred embodiment TEAL or TIBAL or combination thereof is used.

Once the bed is fluidized and the new gas composition is introduced into the reactor, the second catalyst is introduced into the reactor under reactive conditions.

EXAMPLES

In order to provide a better understanding of the present invention the following examples are offered as related to actual tests performed in the practice of this invention.

Example 1

Transitioning from a Ziegler-Natta to a metallocene catalyst is described in this example. This example illustrates a sufficient amount of irreversible catalyst killer to prevent the Ziegler-Natta catalyst from re-initiating. Also this example illustrates that the addition of TMAL into the reactor results in an effective method of scavenging the irreversible catalyst killer, water in this example. This is due to the formation of methyl alumoxane in situ the reactor.

Catalyst Preparation

The metallocene catalyst was prepared from 200° C silica having a water content of 3 weight percent. This catalyst was prepared by mixing 135 pounds (61 kg) of silica with 198.4 pounds (90 kg) of a 30 percent by weight toluene solution of methyl alumoxane. An additional 326 pounds (148 kg) of toluene were added and the mixture held at 146° F. (63° C.) for 2 hours after which 3.65 pounds (1.7 kg) of the bis-(n-butyl cyclopentadiene) zirconium dichloride metallocene was added and allowed to mix for one hour. The catalyst was decanted and solvent exchanged with hexane several times. It was then dried at 135° F. (57° C.) to a free flowing powder. The final catalyst weight was 200 pounds (91 kg). The final catalyst had a zirconium loading of 0.35% and aluminum loading of 13.2%.

The Ziegler-Natta catalyst was prepared by impregnating a titanium chloride, magnesium chloride, and tetrahydrofuran (THF) complex into silica support from a solution of THF. The silica is first dehydrated at 600° C. to remove water and chemically treated with tri-ethyl aluminum to further remove the remaining water. The catalyst was treated by adding tri-n-hexylaluminum (TNHAL) and di-ethylaluminum chloride (DEAC) in isopentane solution and dried to become the final Ziegler-Natta catalyst. The final catalyst had a titanium content of 1% and DEAC/THF mole ratio of 0.25 and TNHAL/THF ratio of 0.30.

TABLE 1

| POLYMERIZATION CONDITIONS | | |
|---|---|---|
| | Ziegler-Natta Catalyst | Metallocene Catalyst |
| Reactor | 2.1 liter autoclave | 2.1 liter autoclave |
| Seed bed | NaCl 150 g | NaCl 150 g |
| Activator | TEAL 1.30 cc (1.98 mmoles) | TEAL 0.4 cc (0.61 mmoles) |
| Catalyst | Ti(Ziegler-Natta) 100 mg as prepared above Al/Ti = 100 (mole) | Metallocene on silica as prepared above 100 mg |
| Hydrogen | 0 | 0 |
| Comonomer | 1-Hexene | 1-Hexene |
| Temperature | 85° C. | 85° C. |
| Time | 60 minutes | 60 minutes |
| Ethylene Pressure | 140 psig (965 kPa) | 75 psig (517 kPa) |
| N$_2$ Pressure | 60 psig (413 kPa) | 75 psig (517 kPa) |
| Total Reactor Pressure | 200 psig (1380 kPa) | 150 psig (1034 kPa) |

The reactor was purged with N$_2$ for ½ hour. 150 g of dehydrated NaCl was introduced into the reactor as a seed bed. The contents of the reactor were then stirred slowly while adding hexene-1 then the TEAL cocatalyst was introduced into the reactor. When the temperature was 83° C., N$_2$ pressure at 60 psig (413 kPa) the Ziegler-Natta catalyst as prepared above was added simultaneously with ethylene. The reactor pressure was adjusted to 200 psig (1380 kPa) with ethylene. The stirer speed was brought to 400 rpm, and the reaction proceeded.

After about one hour into the polymerization, water was injected into the reactor in an amount adequate to neutralize the catalyst and cocatalyst in the reactor (2 molar equivalents based on Ti and Al in reactor). The polymerization rate immediately dropped to zero suggesting that the Ziegler-Natta catalyst activity was suppressed. After waiting for 10 minutes to insure the reaction was not reversible, 0.4 cc of TMAL was then added to the reactor to be converted with the H$_2$O in the reactor to form MAO. After 5 minute reaction with the TMAL, the metallocene catalyst as above was added to the reactor. Polymerization was initiated immediately upon introduction of the metallocene catalyst to the reactor under the metallocene conditions described above in Table 1. The transition process was smooth with no fouling.

Example 2

Transitioning from a Ziegler-Natta to a metallocene catalyst, namely, bis-(n-butyl cyclopentadienyl) zirconium dichloride is described in this example. It does not use any method to deactivate the Ziegler-Natta catalyst and shows the detrimental effect on product properties and the long transition time.

Catalyst Preparation

The metallocene catalyst was identical to that of Example 1. The Ziegler-Natta catalyst was also identical to that of Example 1.

Fluid-Bed Polymerization

The polymerization was conducted in a continuous gas phase fluidized bed reactor. The fluidized bed is made up of polymer granules. The gaseous feed streams of ethylene and hydrogen together with liquid comonomer were mixed together in a mixing tee arrangement and introduced below the reactor bed into the recycle gas line. Both butene and hexene were used as comonomers. Tri-ethyl aluminum (TEAL) was mixed with this stream as a 1% by weight solution in isopentane carrier solvent. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid Ziegler-Natta catalyst was injected directly into the fluidized bed using purified nitrogen as a carrier. Its rate was adjusted to maintain a constant production rate. The reacting bed of growing polymer particles was maintained in a fluidized state by the continuous flow of the make up feed and recycle gas through the reaction zone. A superficial gas velocity of 1–2 ft./sec. (0.3 m/s – 0.6 m/s) was used to achieve this. The reactor was operated at a total pressure of 300 psig (2069 kPa). To maintain a constant reactor temperature, the temperature of the recycle gas was continuously adjusted to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which is simultaneously vented back to the reactor. This allows for highly efficient removal of the product, while at the same time recycling a large portion of the unreacted gases back to the reactor. This product was purged to remove entrained hydrocarbons and treated with a small steam of humidified nitrogen to deactivate any trace quantities of residual catalyst.

The properties of the polymer was determined by the following test methods:

Melt Index: ASTM D-1238- Condition E
Density: ASTM D- 1505
Bulk Density: The resin is poured via a ⅞ "diameter funnel into a fixed volume cylinder of 400 cc. The bulk density is measured as the weight of resin divided by 400 cc to give a value in g/cc.
Particle Size: The particle size is measured by determining the weight of material collected on a series of U.S. Standard sieves and determining the weight average particle size based on the sieve series used.

The fines are defined as the percentage of the total distribution passing through a 120 mesh standard sieve. This has a particle size equivalent of 120 microns. Fines are important since high levels can lead to sheeting and fouling of the reaction cycle gas system. This results in heat exchanger distributor plate fouling requiring a reactor shut down to clean out.

Experimental Results

The reactor was at steady state using the conventional Ziegler-Natta catalyst producing a 17 melt index and 0.9234 density butene copolymer. Run conditions were as follows, see Table 2 below.

TABLE 2

| Catalyst | Run Conditions Titanium Ziegler-Natta |
|---|---|
| Ti (wt %) | 0.98 |
| Temperature (°C.) | 85 |
| Pressure (bar) | 21.7 |
| Ethylene (mole %) | 35.1 |
| Hydrogen (mole %) | 19.0 |
| Butene (mole %) | 14.0 |
| TEAL Concentration (ppm) | 247 |
| Bed Weight (Kg) | 139 |
| Production Rate (Kg/Hr) | 33 |
| Catalyst Productivity (Kg/Kg) | 4900 |
| Bulk Density (g/cc) | 0.40 |
| Average Particle Size (microns) | 652 |

TABLE 2-continued

| Catalyst | Run Conditions Titanium Ziegler-Natta |
|---|---|
| Fines (% less than 120 microns) | 0.55 |

The transition was started by reducing the TEAL concentration to 200 ppm. After two hours, the catalyst feed was stopped and the feed rate of the 2% by weight of TEAL solution was decreased to 100 cc/hr. Once the reaction had dropped to less than 5 Kg/hr, the reactor was depressurized to remove the high concentration of hydrogen. The reactor composition was then adjusted by bringing in fresh gas to the following targets:

| Ethylene (mole %) | 28 |
|---|---|
| Hydrogen (mole %) | 0.070 (700 ppm) |
| Butene (mole %) | 1.6 |

The catalyst was then started at 5 g/hr. The catalyst feed was increased in 1 g/hr increments to increase the reaction rate. Initially, the reaction rate was very low. However, after a period of time, it began to slowly increase. The production rate and catalyst feed rate are shown in the plot below, FIG. 1. The plot shows the progress of the reaction from the time of catalyst injection. The reaction initially increased and reached a steady state value of approximately 30 Kg/hr for approximately 8 hours, after which time it increased again to a rate of 65 Kg/hr. The sudden increase in rate is characteristic of a delayed reaction of the metallocene. The initial surge in rate from time 0 to about 8 hours was due to the residual Ziegler-Natta catalyst.

The fact that the initial reaction was due to the Ziegler-Natta catalyst was confirmed by the sudden drop in the melt index of the product to 0.44 dg/10 min at an elapsed time of four and a half hours. This drop occurred from an initial value of 17 MI and indicated the formation of very high molecular weight polyethylene. This would be expected at the conditions used for a Ziegler-Natta reaction. After 18 hours elapsed time the melt index had reached a value of 22. The final run conditions of the metallocene catalyst were achieved after 46 hours when the melt index reached 24 dg/min and density 0.924 g/cc. The corresponding run conditions were as follows, see Table 3 below.

TABLE 3

| Catalyst | Run Conditions Metallocene |
|---|---|
| Zr (wt %) | 0.35 |
| Temperature (°C.) | 86 |
| Pressure (bar) | 21.7 |
| Ethylene (mole %) | 32.8 |
| Hydrogen (mole %) | 0.050 (502 ppm) |
| Butene (mole %) | 2.1 |
| TEAL Concentration (ppm) | 110 |
| Bed Weight (Kg) | 135 |
| Production Rate (Kg/Hr) | 37 |
| Catalyst Productivity (Kg/Kg) | 3500 |
| Bulk Density (g/cc) | 0.35 |
| Average Particle Size (microns) | 590 |
| Fines (% less than 120 microns) | 3.28 |

Although the fines reached a steady state value of 3.28%, they were much higher than this in the early stages of the transition. Fines as high as 13.3% were recorded. The fines peaked 24 hours after the start of the transition, corresponding to the increase in the production rate to its steady state value.

These results show the detrimental effect of allowing the transition to proceed without the use of a reversible or irreversible catalyst killer. Low melt index values cause extreme formation of gels in the product. High fines resulted in reactor cycle gas fouling.

Example 3

Transitioning from a Ziegler-Natta to a metallocene catalyst, namely, bis-(methyl n-butyl cyclopentadienyl) zirconium dichloride is described in this example. It uses a reversible catalyst killer and an irreversible catalyst killer to deactivate the Ziegler-Natta catalyst and shows the beneficial effect on product properties and a shorter transition time.

Catalyst Preparation

The metallocene catalyst was prepared from 200° C. silica having a water content of 2.8 weight percent. This catalyst was prepared by mixing 52 kilograms of silica with 69 kilograms of a 30 percent by weight toluene solution of methyl alumoxane. An additional 98 kilograms of toluene were added and the mixture held at 27° C. after which 1.5 kilograms of the bis-(methyl n-butyl cyclopentadiene) zirconium dichloride metallocene was added and allowed to mix for one hour. The catalyst was decanted and solvent exchanged with hexane several times. It was then dried at 56° C. to a free flowing powder. The final catalyst weight was 55 kilograms. The final catalyst had a zirconium loading of 0.45% and aluminum loading of 12.4%.

The Ziegler-Natta catalyst was prepared by impregnating a titanium chloride, magnesium chloride, and tetrahydrofuran (THF) complex into silica support from a solution of THF. The silica is first dehydrated at 600° C. to remove water and chemically treated with tri-ethyl aluminum to further remove the remaining water. The catalyst was treated by adding tri-n-hexylaluminum (TNHAL) and di-ethylaluminum chloride (DEAC) in isopentane solution and dried to become the final Ziegler-Natta catalyst. The final catalyst had a titanium content of 1% and DEAC/THF mole ratio of 0.42 and TNHAL/THF ratio of 0.28.

Fluid-Bed Polymerization

The polymerization was conducted in the same continuous reactor as in Example 2 except that the reactor volume was larger.

Experimental Results

The reactor was at steady state using the conventional Ziegler-Natta catalyst producing a 0.7 melt index and 0.927 density hexene copolymer. Run conditions were as follows, see Table 4 below.

TABLE 4

| Catalyst | Run Conditions Titanium Ziegler-Natta |
| --- | --- |
| Ti (wt %) | 1.0 |
| Temperature (°C.) | 82 |
| Pressure (bar) | 21.7 |
| Ethylene (mole %) | 35.0 |
| Hydrogen (mole %) | 7.34 |
| Butene (mole %) | 3.83 |
| TEAL Concentration (ppm) | 230 |
| Bed Weight (Kg) | 202 |
| Production Rate (Kg/Hr) | 62 |
| Catalyst Productivity (Kg/Kg) | 4300 |
| Bulk Density (g/cc) | 0.42 |

TABLE 4-continued

| Catalyst | Run Conditions Titanium Ziegler-Natta |
| --- | --- |
| Average Particle Size (microns) | 693 |
| Fines (% less than 120 microns) | 1.99 |

The transition was started by reducing the TEAL concentration to 150 ppm to reduce the residual alkyl in the reactor bed. After two hours, the catalyst feed was stopped and the reaction was killed by injecting 800 ppm of carbon monoxide, a reversible catalyst killer. Once the reaction was killed, 46 grams of water, an irreversible catalyst killer, was injected into the cycle gas piping below the distributor plate and allowed to circulate for 30 minutes. This resulted in 225 ppm by weight of water in the reactor and corresponds to a 2:1 molar ratio of water to the Ziegler-Natta active catalyst components including aluminum alkyl. A series of reactor blowdowns were taken to reduce the hydrogen concentration in the reactor. The reactor composition was then adjusted by bringing in fresh gas to the following targets:

| Ethylene (mole %) | 50 |
| --- | --- |
| Hydrogen (mole %) | 0.008 (80 ppm) |
| Hexene (mole %) | 1.1 |

Figure 2:
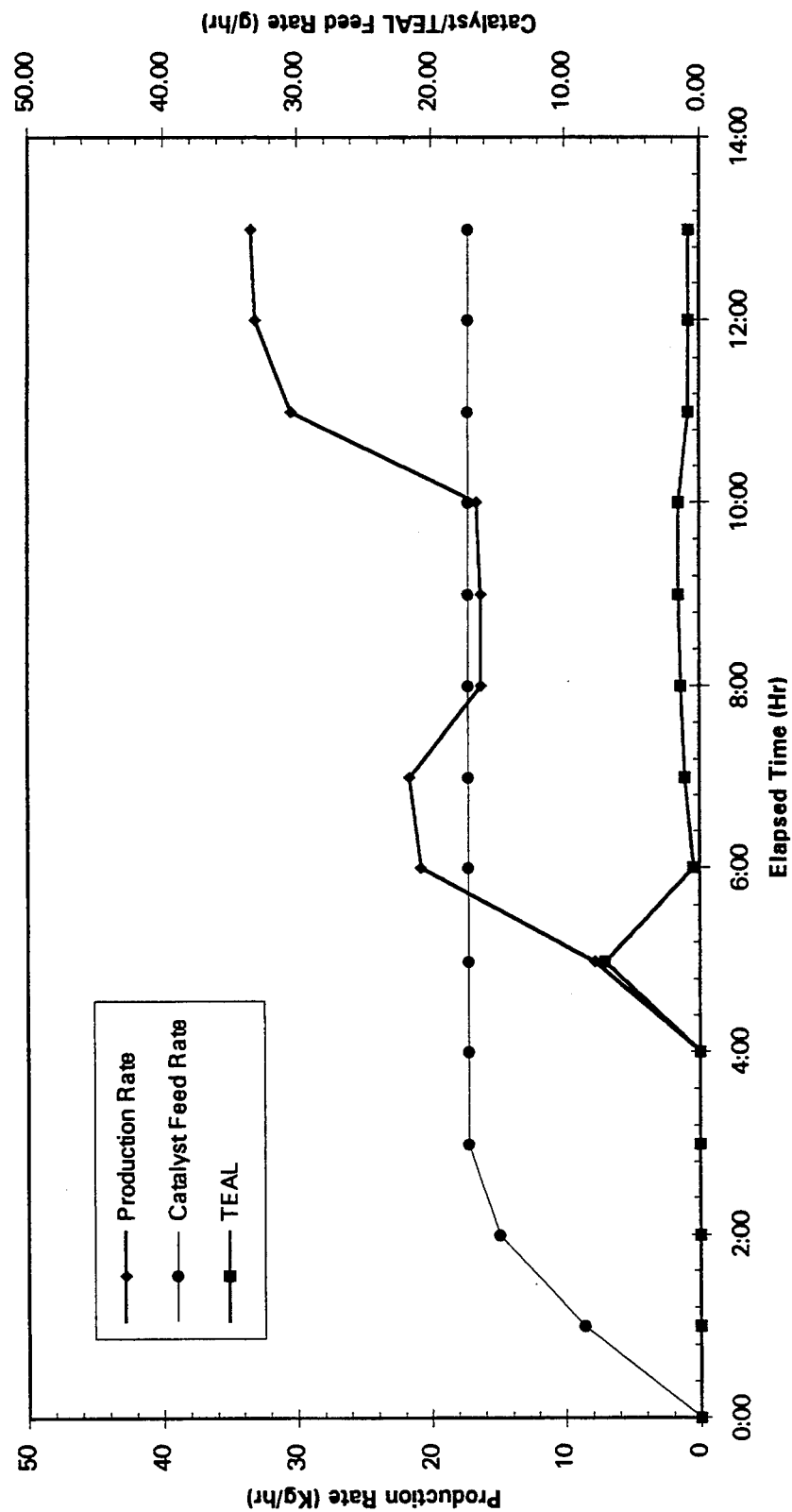
FIG. 2 illustrates a transition profile of production rate, catalyst feed rate and TEAL feed rate versus time for Example 3.

The catalyst was then started at 9 g/hr. The catalyst feed was increased in 4.5 g/hr increments over the next two hours to increase the reaction rate. Initially, the reaction rate was very low. The aluminum alkyl was not started until four hours later when the concentration of catalyst in the bed reached 350 ppm. At that point a "spike" of 50 ppm of TEAL based on the bed weight was added. Reaction immediately commenced. The reaction continued to build reaching steady state after approximately 12 hours from the start of catalyst injection. The plot below, FIG. 2, shows the progress of the reaction from the time of catalyst injection In this case, there was no affect due to the Ziegler-Natta catalyst as confirmed by absence of a sudden drop in the melt index. The melt index of the product steadily increased from its initial value of 0.61 to a final value of 0.75 at an elapsed time of twelve hours. The final run conditions of the metallocene catalyst were achieved after 12 hours when the melt index reached 0.75 dg/min and density 0.9238 g/cc. The corresponding run conditions were as follows, see Table 5 below.

TABLE 5

| Catalyst | Run Conditions Metallocene |
| --- | --- |
| Zr (wt %) | 0.45 |
| Temperature (°C.) | 79 |
| Pressure (bar) | 21.7 |
| Ethylene (mole %) | 49.9 |
| Hydrogen (mole %) | 0.0078 (78 ppm) |
| Hexene (mole %) | 1.05 |
| TEAL Concentration (ppm) | 55 |
| Bed Weight (Kg) | 192 |
| Production Rate (Kg/Hr) | 33 |
| Catalyst Productivity (Kg/Kg) | 1940 |
| Bulk Density (g/cc) | 0.422 |
| Average Particle Size (microns) | 870 |
| Fines (% less than 120 microns) | 0.45 |

The fines actually decreased during the transition from an average of 1.8 to 0.45% indicating the lack of increased fines generation. These results show the beneficial effect of allowing the transition to proceed with the use of a reversible and irreversible catalyst killer. Neither low melt index nor high fines were formed.

Example 4

Transitioning from a Ziegler-Natta to a metallocene catalyst, namely, bis-(methyl n-butyl cyclopentadienyl) zirconium dichloride is described in this example. It uses water as the irreversible catalyst killer to deactivate the Ziegler-Natta catalyst and shows that the amount of water used is important. Too low an amount of water allows the Ziegler-Natta catalyst to reactivate, resulting in high fines and ultra high molecular weight polymer (low melt index).

Catalyst Preparation

The metallocene catalyst was identical to that of Example 3.

The Ziegler-Natta catalyst was also identical to that of Example 3.

Fluid-Bed Polymerization

The polymerization was conducted in the same continuous reactor as in Example 3.

Experimental Results

The reactor was operating at steady state using the conventional Ziegler-Natta catalyst producing a 0.5 melt index and 0.927 density hexene copolymer. Run conditions were as follows, see Table 6 below.

TABLE 6

| Catalyst | Run Conditions |
|---|---|
|  | Titanium Ziegler-Natta |
| Ti (wt %) | 1.0 |
| Temperature (°C.) | 82 |
| Pressure (bar) | 21.7 |
| Ethylene (mole %) | 34.8 |
| Hydrogen (mole %) | 7.31 |
| Hexene (mole %) | 3.40 |
| TEAL Concentration (ppm) | 200 |
| Bed Weight (Kg) | 200 |
| Production Rate (Kg/Hr) | 53 |
| Catalyst Productivity (Kg/Kg) | 3820 |
| Bulk Density (g/cc) | 0.42 |
| Average Particle Size (microns) | 604 |
| Fines (% less than 120 microns) | 1.45 |

The transition was started by reducing the TEAL concentration to 150 ppm to reduce the residual alkyl in the reactor bed. After nine hours, the catalyst feed was stopped and the reactor was killed by injecting 800 ppm of carbon monoxide. Once the reaction was killed, 20 grams of water was injected into the cycle gas piping below the distributor plate and allowed to circulate for 30 minutes. This resulted in 100 ppm by weight of water in the reactor and corresponds to a 0.9:1 molar ratio of water to the Ziegler-Natta active catalyst components including aluminum alkyl. A series of reactor blowdowns were taken to reduce the hydrogen concentration in the reactor. The reactor composition was then adjusted by bringing in fresh gas to the following targets:

| Ethylene (mole %) | 50 |
| Hydrogen (mole %) | 0.008 (80 ppm) |
| Hexene (mole %) | 1.1 |

Immediately upon the introduction of ethylene to the reactor a slight reaction was noticed. Continuing addition of the hydrogen and hexene resulted in an additional reaction which peaked at 21 Kg/hr instantaneously. This increase was noted in the absence of any metallocene catalyst addition. At the same time the melt index was observed to have dropped to as low as 0.2 dg/min. The fines dropped to 0.15%. The reactor was then "killed" with carbon monoxide and a second water injection of 21 g completed. The concentrations were re-established and the metallocene catalyst started. Shortly thereafter the reactor had to be shut down due to the formation of reactor sheets.

This example demonstrates that the amount of irreversible catalyst killer is important to effectively transition from a Ziegler-Natta catalyst to a metallocene catalyst. If, as in this case, the amount of irreversible catalyst killer is too low, the Ziegler-Natta reaction will re-initiate, and lead to reactor operability problems as well as low melt index polymer.

Example 5

Transitioning from a Ziegler-Natta to a metallocene catalyst, namely, bis-(1,3-methyl n-butyl cyclopentadiene) zirconium dichloride is described in this example. It uses water to deactivate the Ziegler-Natta catalyst and shows that the amount of water used to deactivate the Ziegler-Natta catalyst is important. This example repeats that of Example 3 when using a higher water concentration.

Catalyst Preparation

The metallocene catalyst was prepared from 200° C. silica having a water content of 3 weight percent. This catalyst was prepared by mixing 3.9 kilograms of silica with 4.9 kilograms of a 30 percent by weight toluene solution of methyl alumoxane. An additional 10 kilograms of toluene were added and the mixture held at 29° C. after which 113 grams of the bis-(1,3-methyl n-butyl cyclopentadiene) zirconium dichloride metallocene component was added and allowed to mix for one hour. The catalyst was decanted and solvent exchanged with hexane several times. It was then dried at 57° C. to a free flowing powder. The final catalyst weight was 5 kilograms. The final catalyst had a zirconium loading of 0.42% and aluminum loading of 10.1%.

The Ziegler-Natta catalyst was identical to that of Example 3.

Fluid-Bed Polymerization The polymerization was conducted in the same continuous reactor as in Example 3.

Experimental Results

The reactor was at steady state using the Ziegler-Natta catalyst producing a 2.1 melt index and 0.930 density hexene copolymer. Run conditions were as follows, see Table 7 below.

TABLE 7

| Catalyst | Run Conditions |
|---|---|
|  | Titanium Ziegler-Natta |
| Ti (wt %) | 1.0 |
| Temperature (°C.) | 82 |
| Pressure (bar) | 21.7 |
| Ethylene (mole %) | 35.2 |
| Hydrogen (mole %) | 14.1 |
| Hexene (mole %) | 3.15 |
| TEAL Concentration (ppm) | 265 |
| Bed Weight (Kg) | 204 |

TABLE 7-continued

| Run Conditions | |
|---|---|
| Catalyst | Titanium Ziegler-Natta |
| Production Rate (Kg/Hr) | 43 |
| Catalyst Productivity (Kg/Kg) | 2620 |
| Bulk Density (g/cc) | 0.42 |
| Average Particle Size (niicrons) | 587 |
| Fines (% less than 120 microns) | 1.55 |

The transition was started by reducing the TEAL concentration to 150 ppm to reduce the residual alkyl in the reactor bed. After ten hours, the catalyst feed was stopped and the reactor was killed by injecting 800 ppm of carbon monoxide. Once the reaction was killed, 50 grams of water was injected into the cycle gas piping below the distributor plate and allowed to circulate for 30 minutes. This resulted in 230 ppm by weight of water in the reactor and corresponds to a 2.2:1 molar ratio of water to the Ziegler-Natta active catalyst components including aluminum alkyl. A series of reactor blowdowns were taken to reduce the hydrogen concentration in the reactor. The reactor composition was then adjusted by bringing in fresh gas to the following targets:

| Ethylene (mole %) | 50 |
|---|---|
| Hydrogen (mole %) | 0.008 (80 ppm) |
| Hexene (mole %) | 0.8 |

Figure 3:
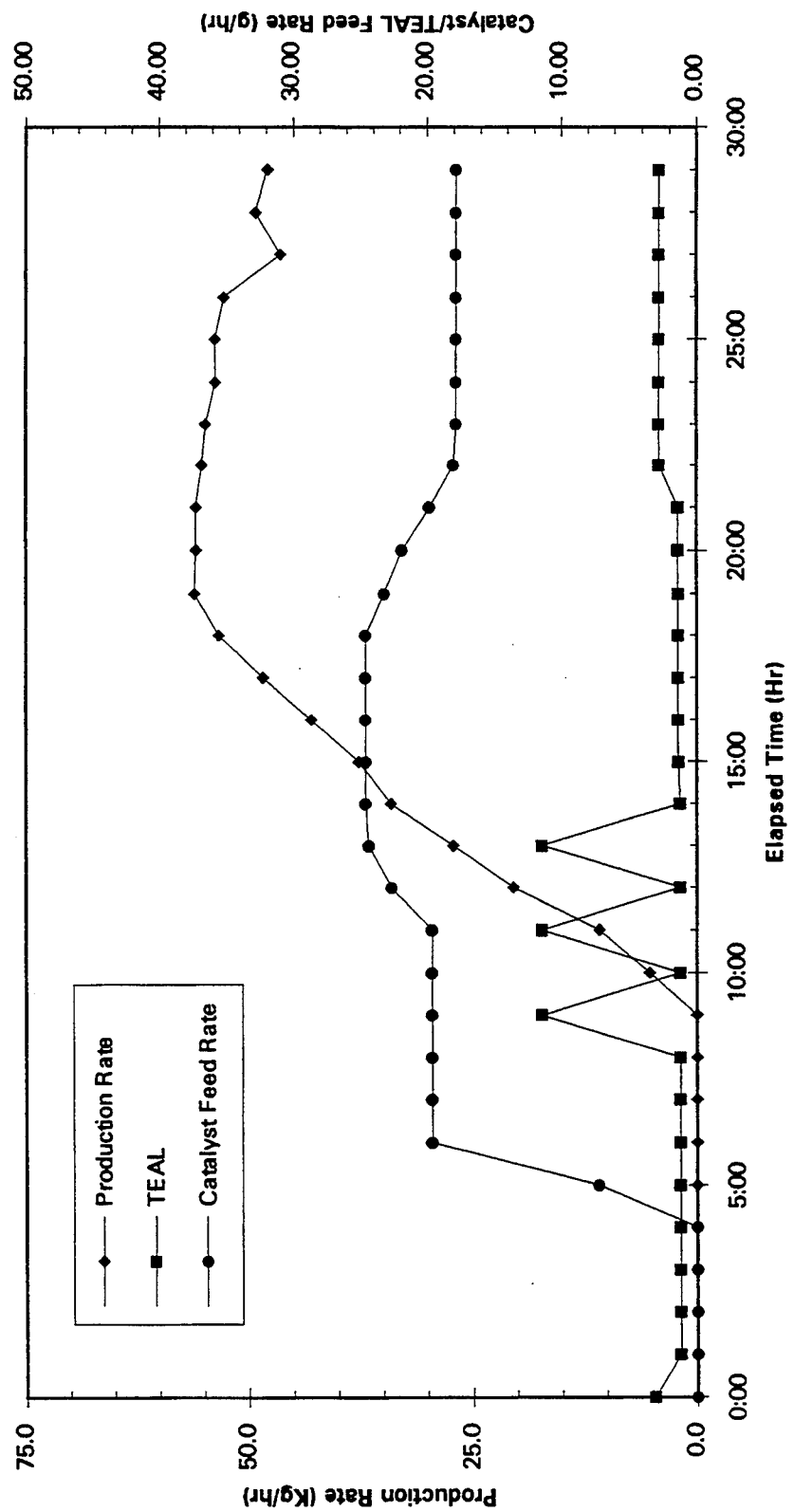
FIG. 3 illustrates a transition profile of production rate, catalyst feed rate and TEAL feed rate versus time for Example 5.

No reaction was noted during this entire time period, showing the total absence of the Ziegler-Natta reaction. The aluminum alkyl was also started during the introduction of the reactor feeds at a rate of 1.2 g/hr to aid in scavenging of impurities and to establish the reaction more readily. The catalyst was then started at 20 g/hr and held constant for several hours until it was increased and subsequently decreased. After four hours a "spike" of 50 ppm of TEAL based on the bed weight was added. Reaction immediately commenced. The reaction continued to build reaching steady state after approximately 14 hours from the start of catalyst injection. The plot below, FIG. 3, shows the progress of the reaction from the time of catalyst injection.

In this case, there was no reaction due to the Ziegler-Natta catalyst as confirmed by absence of a sudden drop in the melt index. The melt index of the product steadily decreased from its initial value of 2.1 to a final target value of 0.7 at an elapsed time of twenty-nine hours. The final run conditions of the metallocene catalyst were as follows, see Table 8 below.

TABLE 8

| Run Conditions | |
|---|---|
| Catalyst | Metallocene |
| Zr (wt %) | 0.42 |
| Temperature (°C.) | 79 |
| Pressure (bar) | 21.7 |
| Ethylene (mole %) | 50.1 |
| Hydrogen (mole %) | 0.0083 (83 ppm) |
| Hexene (mole %) | 0.91 |
| TEAL Concentration (ppm) | 125 |
| Bed Weight (Kg) | 203 |
| Production Rate (Kg/Hr) | 55 |
| Catalyst Productivity (Kg/Kg) | 3000 |
| Bulk Density (g/cc) | 0.44 |
| Average Particle Size (microns) | 584 |
| Fines (% less than 120 microns) | 1.44 |

The fines decreased slightly during the transition from an average of 1.5 to 1.4% indicating the lack of increased fine generation. These results confirm the beneficial effect of allowing the transition to proceed with a sufficient amount of an irreversible catalyst killer. Neither low melt index nor high fines were formed.

Example 6

Transitioning from a Ziegler-Natta to a metallocene catalyst, namely, bis-(1,3-methyl n-butyl cyclopentadienyl) zirconium dichloride is described in this example. It uses water to deactivate the Ziegler-Natta catalyst external from the reactor together with a TEAL passivation step. This example shows that lower amounts of water can be used to deactivate the Ziegler-Natta catalyst together with air deactivation.

Catalyst Preparation

The metallocene catalyst was prepared from 200° C. silica having a water content of 4.1 weight percent. This catalyst was prepared by mixing 104 kilograms of silica with 40.8 kilograms of a 29 percent by weight toluene solution of methyl alumoxane. An additional 195 kilograms of toluene were added and the mixture held at 27° C. after which 2.8 kilograms of the bis-(methyl n-butyl cyclopentadiene) zirconium dichloride metallocene was added and allowed to mix for one hour. The catalyst was decanted and solvent exchanged with hexane several times. It was then dried at 65° C. to a free flowing powder. The final catalyst weight was 84 kilograms. The final catalyst had a zirconium loading of 0.35% and aluminum loading of 12.75%.

The Ziegler-Natta catalyst was identical to that of Example 5.

Fluid-Bed Polymerization

The polymerization was conducted in the same continuous reactor as in Example 2.

Experimental Results

The reactor was first prepared by charging 145 kilograms of a "seed bed" of a Ziegler-Natta polymer, a linear low density polyethylene having a melt index of 1 dg/min and density of 0.918 g/cc. It had been prepared in a commercial scale reactor operating at a production rate of 27,000 Kilograms/hr. It was deactivated by purging the reactor product in a separate vessel with steam in the amount of 1.59 Kilograms/hr. This amounts to a water content of 58 ppm by weight. It was further deactivated by air containing oxygen and water in a transfer line conveyor by using air as the conveying gas. Thus, the molar ratio of the total water to the active Ziegler-Natta catalyst components and aluminum alkyls was 3.5:1.

The transition was started by drying down the reactor polymer bed to a residual moisture level of 18 ppm by weight. The reactor was then charged with ethylene and 11% by weight of a TEAL solution in isopentane at a rate of 250 c/hr. Once the ethylene concentration reached 50 mole %, the TEAL rate was increased to 475 cc/hr until a total of 600 cc of TEAL solution had been added. This corresponded to a total TEAL concentration of 290 ppm by weight. The reactor was then held at 79° C. under circulation at 0.5 m/sec velocity for six hours. This step is referred to as alkyl "passivation". It is used to reduce the static in the reactor and fines attachment to the walls of the reactor. It can be monitored with temperature probes attached very close to the wall of the reactor (0.5 cm). The formation of a "cold band" of reading 5° C. or more below the reactor temperature is indicative of fines attachment to the wall. The TEAL passivation step removes these fines as evidenced by the disappearance of the cold band.

An additional measurement of the fines attachment is provided by a static probe. This prove measures static in the reactor bed. Readings can vary as high as plus/minus several thousand volts. The "cold band" formation described above is usually accompanied by high negative static readings. The TEAL passivation reduces this static reading to a value of close to zero.

After the six hour hold period, the reactor concentrations were then adjusted to the following targets:

| Ethylene (mole %) | 55 |
|---|---|
| Hydrogen (mole %) | 0.0095 (95 ppm) |
| Hexene (mole %) | 1.2 |

Figure 4:
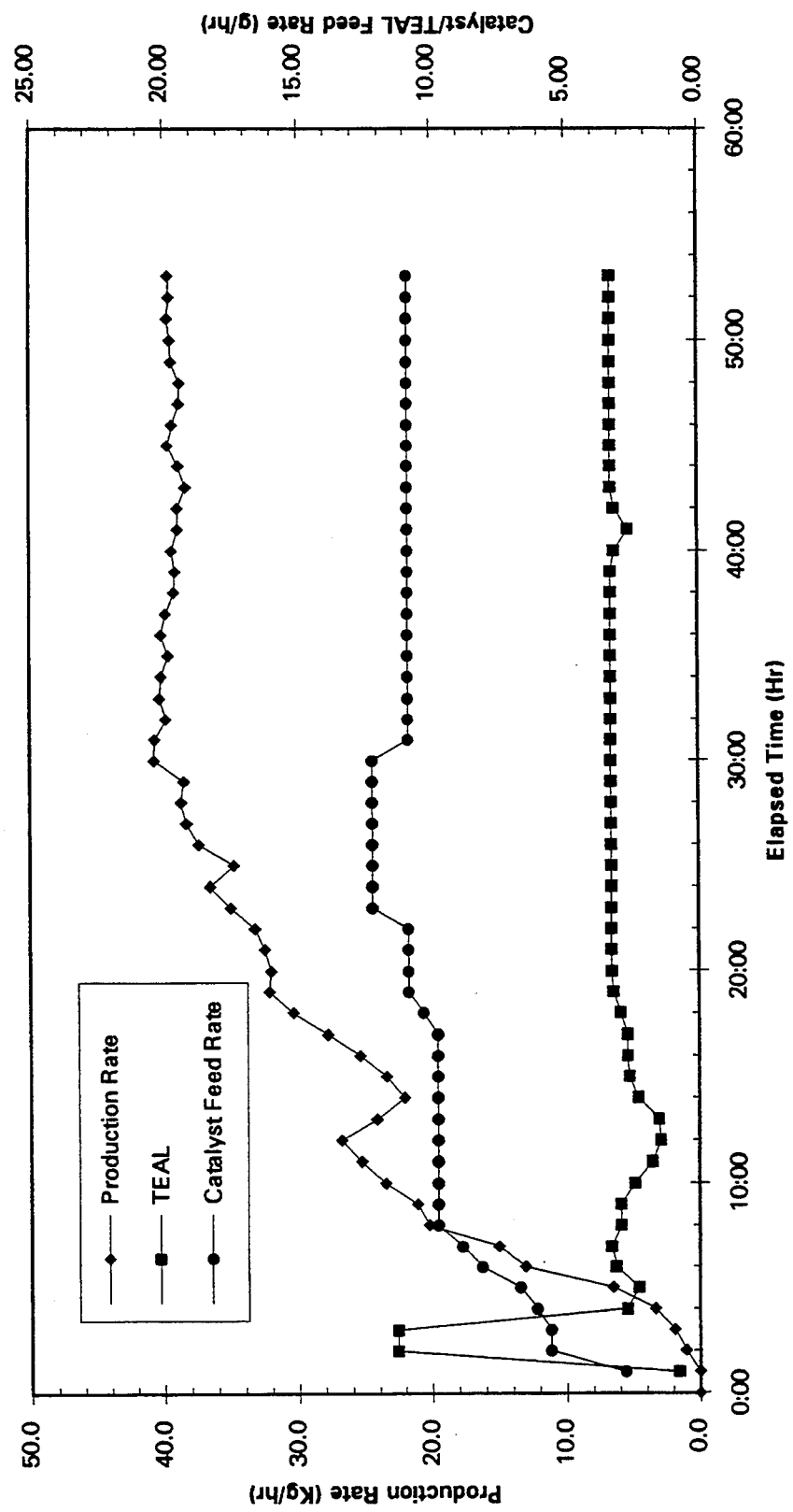
FIG. 4 illustrates a transition profile of production rate, catalyst feed rate and TEAL feed rate versus time for Example 6.

A 1% by weight of a TEAL solution was started at a rate of 250 cc/hr together with catalyst at 5-6 g/hr. Reaction was noted after approximately 4 hours from the start of feeding catalyst. The reaction continued to build reaching steady state after approximately 24 hours from the start of catalyst injection. Two separate injections of additional TEAL, so called TEAL "spikes" were used to accelerate the reaction rate. The plot below, FIG. 4 shows the progress of the reaction from the time of catalyst injection.

In this case also, there was no reaction due to the Ziegler-Natta catalyst as confirmed by absence of a sudden drop in the melt index. The melt index of the product steadily decreased from its initial value of 1.1 to a final target value of 0.85 at an elapsed time of fifty-three hours. The final run conditions of the metallocene catalyst were as follows, see Table 9 below.

TABLE 9

| Catalyst | Run Conditions Metallocene |
|---|---|
| Zr (wt %) | 0.35 |
| Temperature (°C.) | 79 |
| Pressure (bar) | 21.7 |
| Ethylene (mole %) | 54.5 |
| Hydrogen (mole %) | 0.0094 (94 ppm) |
| Hexene (mole %) | 1.19 |
| TEAL Concentration (ppm) | 186 |
| Bed Weight (Kg) | 145 |
| Production Rate (Kg/Hr) | 40 |
| Catalyst Productivity (Kg/Kg) | 3630 |
| Bulk Density (g/cc) | 0.44 |
| Average Particle Size (microns) | 824 |
| Fines (% less than 120 microns) | 1.44 |

The fines increased slightly during the transition from 0.35 to 1.4%, a steady state was achieved. These results confirm via an alternative method the beneficial effect of allowing the transition to proceed by the permanent "killing" of the Ziegler-Natta reaction. It also shows the advantage of TEAL passivation to eliminate start-up sheeting and fouling.

While the present invention has been described and illustrated by reference to particular embodiments, it will be appreciated by those of ordinary skill in the art that the inventions lends itself to variations not necessarily illustrated herein. For example, it is not beyond the scope of this invention to transition between one or more mixed catalysts to one or more incompatible mixed catalysts and vice-versa. It is also contemplated by the invention that one or more reactors can be used, where the process of the invention takes place within a first reactor or within a second reactor or in an intermediate location before entering the first (when one reactor is being used) or the second reactor (when two or more reactors are being used in series or otherwise). For this reason, then, references should be made solely to the appended claims for purposes of determining the true scope of the present invention.

We claim:

1. A process for transitioning from a polymerization reaction catalyzed by a first catalyst to one catalyzed by a second catalyst comprising a metallocene catalyst wherein said first and second catalysts are incompatible, said process comprising the steps of:
   a) discontinuing the introduction of the first catalyst into a reactor;
   b) introducing into the reactor an irreversible catalyst killer in an amount greater than about 1 molar equivalent based on the total gram atom metal of the first catalyst in the reactor; and
   c) introducing the second catalyst into the reactor.

2. The process of claim 1 wherein the first catalyst comprises a traditional Ziegler-Natta catalyst.

3. The process of claim 1 wherein the amount of irreversible catalyst killer is greater than about 2 molar equivalent based on the total gram atom metal of the first catalyst in the reactor.

4. The process of claim 1 wherein the irreversible catalyst killer is water.

5. The process of claim 1 wherein the process further comprises introducing a reversible catalyst killer.

6. The process of claim 5 wherein the amount of reversible catalyst killer is greater than 2 molar equivalent based on the total gram atom metal of the first catalyst in the reactor.

7. The process of claim 6 wherein the reversible catalyst killer is at least one of the group consisting of CO and $CO_2$.

8. The process of claim 1 wherein the process further comprises introducing an organometallic compound prior to step (c).

9. The process of claim 8 wherein the process further comprises rendering the first catalyst substantially incapable of polymerization.

10. A process for transitioning from a polymerization reaction catalyzed by a first catalyst to one catalyzed by a second catalyst comprises a metallocene catalyst wherein said first and second catalysts are incompatible, said process comprising the steps of:
    a) discontinuing the introduction of the first catalyst into a reactor;
    b) rendering the first catalyst substantially incapable of polymerization;
    c) introducing into the reactor an irreversible catalyst killer in an amount sufficient to inactivate substantially all of said first catalyst; and
    d) introducing the second catalyst into the reactor.

11. The process of claim 10 wherein the first catalyst comprises a traditional Ziegler-Natta catalyst.

12. The process of claim 10 wherein the amount of irreversible catalyst killer is greater than about 2 molar equivalent based on the total gram atom metal of the first catalyst in the reactor.

13. The process of claim 10 wherein said first catalyst is rendered substantially incapable of polymerization by the introduction of a reversible catalyst killer.

14. The process of claim 13 wherein the amount of reversible catalyst killer is greater than 2 molar equivalent based on the total gram atom metal of the first catalyst in the reactor.

15. The process of claim 10 wherein the process further comprises the step of removing impurities from the reactor prior to step (d).

* * * * *